(12) United States Patent
Rankin

(10) Patent No.: US 11,663,542 B2
(45) Date of Patent: May 30, 2023

(54) ELECTRONIC KNOWLEDGE CREATION AND MANAGEMENT VISUAL TRANSFORMATION TOOL

(71) Applicant: Clay Rankin, Fairhope, AL (US)

(72) Inventor: Clay Rankin, Fairhope, AL (US)

( * ) Notice: Subject to any disclaimer, the term of this patent is extended or adjusted under 35 U.S.C. 154(b) by 21 days.

(21) Appl. No.: 17/093,605

(22) Filed: Nov. 9, 2020

(65) Prior Publication Data
US 2021/0142252 A1     May 13, 2021

Related U.S. Application Data

(60) Provisional application No. 62/931,884, filed on Nov. 7, 2019.

(51) Int. Cl.
| | |
|---|---|
| *G06Q 10/06* | (2023.01) |
| *G06Q 10/10* | (2023.01) |
| *G06Q 10/0631* | (2023.01) |

(52) U.S. Cl.
CPC ....... *G06Q 10/06316* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 6,612,382 B2 * | 9/2003 | King | E21B 44/005 702/9 |
| 7,778,859 B2 * | 8/2010 | Bouzas | G06Q 10/063 705/7.11 |
| 9,563,863 B2 * | 2/2017 | Nielsen | G06Q 10/06 |
| 11,023,656 B2 * | 6/2021 | Abbott | G06F 3/0486 |

(Continued)

FOREIGN PATENT DOCUMENTS

| | | | | |
|---|---|---|---|---|
| WO | WO-2010093424 A2 * | 8/2010 | | G06Q 10/06 |
| WO | WO-2014138210 A1 * | 9/2014 | | |

OTHER PUBLICATIONS

Cognito software, Twitter webpages Mar. 2010 to Jan. 2017 https://twitter.com/cognitosoftware?lang=en (Year: 2017).*

(Continued)

*Primary Examiner* — Octavian Rotaru
(74) *Attorney, Agent, or Firm* — Adams IP, LLC; James Adams; Edward Garner

(57) ABSTRACT

A system and method for contextually organizing and visualizing electronic work product is provided. The system generally comprises a processor, a power supply, a computing device operably connected to the processor, and a non-transitory computer-readable medium coupled to the processor and having instructions stored thereon. The processor may query the non-transitory computer-readable medium and/or a database for electronic work product based on search parameters input by a professional. The processor may then contextually visualize the electronic work product within the user interface as a professional task. The professional may navigate the professional task via the user interface and create new work product, which will be saved by the system for future task generation. Varying permission levels may allow certain professionals to monitor professional task progress, create new tasks, and assign new tasks as necessary.

6 Claims, 10 Drawing Sheets

(56) References Cited

U.S. PATENT DOCUMENTS

| | | | |
|---|---|---|---|
| 2007/0078672 A1* | 4/2007 | Lee | G06Q 50/18 705/311 |
| 2007/0083283 A1* | 4/2007 | Ara | G06Q 10/0631 700/111 |
| 2007/0192671 A1* | 8/2007 | Rufener | G06F 40/166 707/999.001 |
| 2008/0065981 A1* | 3/2008 | Voslow | G06F 40/186 715/234 |
| 2009/0125362 A1* | 5/2009 | Reid | G06F 8/30 705/7.27 |
| 2010/0205031 A1* | 8/2010 | Nielsen | G06Q 10/063 715/764 |
| 2010/0205032 A1* | 8/2010 | Nielsen | G06Q 10/06 715/702 |
| 2010/0324967 A1* | 12/2010 | Nielsen | G06Q 10/06395 705/315 |
| 2011/0035324 A1* | 2/2011 | Nielsen | G06Q 10/0631 705/301 |
| 2012/0117104 A1* | 5/2012 | Stundner | G06Q 10/00 707/769 |
| 2013/0179208 A1* | 7/2013 | Chung | G06Q 10/06 705/7.15 |
| 2016/0019243 A1* | 1/2016 | Kamel | G06F 16/285 707/803 |
| 2016/0048936 A1* | 2/2016 | Perkowski | G06Q 10/063 705/310 |
| 2016/0165403 A1* | 6/2016 | Turner | H04L 51/222 455/456.3 |
| 2017/0132200 A1* | 5/2017 | Noland | G06F 40/186 |
| 2018/0101281 A1* | 4/2018 | Nelson | G06N 5/022 |
| 2018/0101760 A1* | 4/2018 | Nelson | G06Q 10/10 |
| 2018/0101761 A1* | 4/2018 | Nelson | G06Q 10/10 |
| 2018/0101823 A1* | 4/2018 | Nelson | G06Q 10/10 |
| 2018/0101824 A1* | 4/2018 | Nelson | H04L 12/1831 |
| 2018/0129941 A1* | 5/2018 | Gustafson | G06N 20/00 |
| 2018/0129959 A1* | 5/2018 | Gustafson | G06N 20/00 |
| 2018/0137424 A1* | 5/2018 | Gabaldon Royval | G06N 5/022 |
| 2019/0073730 A1* | 3/2019 | Perkowski | G06Q 50/184 |
| 2019/0108221 A1* | 4/2019 | Nelson | H04M 7/0012 |
| 2019/0108492 A1* | 4/2019 | Nelson | G06K 9/00288 |
| 2019/0108493 A1* | 4/2019 | Nelson | G06Q 10/1095 |
| 2019/0108494 A1* | 4/2019 | Nelson | H04L 12/1831 |
| 2019/0108834 A1* | 4/2019 | Nelson | G10L 15/22 |
| 2019/0227989 A1* | 7/2019 | Keel | G06F 16/9536 |
| 2019/0236124 A1* | 8/2019 | Bumby | G06F 40/186 |
| 2019/0273767 A1* | 9/2019 | Nelson | H04L 65/403 |
| 2020/0342404 A1* | 10/2020 | Jackson | G06Q 30/016 |
| 2020/0394567 A1* | 12/2020 | Choe | G06N 20/20 |

OTHER PUBLICATIONS

Cognito and inventor Clay Rankin featured in Business Alabama magazine, Cognito webpages, Aug. 24, 2021 https://cognitosoftware.com/2021/08/24/cognito-and-inventor-clay-rankin-featured-in-business-alabama-magazine/ (Year: 2021).*

Alec Harvey, Fairhope lawyer develops Cognito software to help keep attorneys organized, business alabama webpages, Aug. 10, 2021 https://businessalabama.com/fairhope-lawyer-develops-cognito-software-to-help-keep-attorneys-organized/ (Year: 2021).*

USPTO, Office Action Correspondence System, OACS, Part 2 training, Oct. 2011 (Year: 2011).*

USPTO, PE2E-OC Official Correspondence User Manual, Aug. 2017 (Year: 2017).*

Eastep et al., Smart data structures, an online machine learning approach to multicore data structures, InProceedings of the 8th ACM international conference on Autonomic computing, pp. 11-20, Jun. 14, 2011 https://dl.acm.org/doi/abs/10.1145/1998582.1998587 (Year: 2011).*

* cited by examiner

| 511 | | | | | | |
|---|---|---|---|---|---|---|
| | 535A-F | Copy | Cut | Paste | Clipboard | Redo/Undo | Insert |
| Subtask 1 | Items | Related Data | | | | | |
| Subtask 2 | Notes | | | | | | |
| Subtask 3 | Draft | | | | | | |
| Subtask 4 | Email | | | | | | |
| Subtask 5 | Document | | | | | | |
| | Web | | | | | | |
| | Contact | | | | | | |
| | Quote | | | | | | |

— # ELECTRONIC KNOWLEDGE CREATION AND MANAGEMENT VISUAL TRANSFORMATION TOOL

CROSS REFERENCES

This application claims the benefit of U.S. Provisional Application No. 62/931,884, filed on Nov. 7, 2019, which application is incorporated herein by reference.

FIELD OF THE DISCLOSURE

The subject matter of the present disclosure refers generally to a system and method for contextually organizing and visualizing electronic work product.

BACKGROUND

Throughout a regular workday, professionals in various areas of expertise produce electronic work product, which pertains to a particular task common to their profession. Though the information within a particular task may vary from matter to matter, the organization of the task itself and the type of work product within the task remains more or less the same. For instance, though the information within a brief may change from case to case, the organization of a brief and the types of information within the brief more or less remain the same. Further, there are currently multiple systems that manage different types of information that may be relevant to a task, but this information is not linked in a way that contextually relates it to a task. Over time, this results in the loss of the contextual relationship. For instance, one type of software may manage emails while other software is responsible for the generation of a document relevant. Though the email and document may both be relevant to the same task, current systems do not store them this way. Because all of the information is not stored in a way that would preserve the contextual relationship to the task, the contextual relationship, and thus the information, is lost in time. For instance, emails containing information pertinent to a particular task are often sent between professionals, but there is currently no way to contextually relate these emails to said task along with other work product created by said professionals for said task. Over time, the emails are completely forgotten about, and their contextual relationship to other work product is lost even though the emails may still exist in the depths of some database.

Nor is there currently a complete system for both contextually organizing work product of a particular task and managing who has been assigned said work product for said task. Larger projects are often split into multiple tasks, and these tasks can be further broken down into other smaller tasks depending on their size. When projects and/or tasks are broken up in this manner, it is important that every professional working on said project/task is completing their assigned work in a timely manner in order to prevent bottle necks that can greatly decrease overall efficiency. Additionally, it can be burdensome for a manager of these projects/tasks to keep up with how far along each professional is with their assigned task. Not being able to easily see who is lagging behind on certain work product for a task hinders a manager's ability to correct any efficiency issues in the task generation process. This also decreases the manager's overall efficiency since more time is required to manage one project/task. By increasing the manager's ability to efficiently manage a team of professionals, a manager would have more time to create their own work product and/or effectively manage other professional teams.

Therefore, there is a need in the art for a system and method that contextually organizes and visualizes work product related to a task in order to maximize technological innovation, and therefore, increase the efficiency of professionals.

DESCRIPTION OF THE DRAWINGS

These and other features, aspects, and advantages of the present disclosure will become better understood with regard to the following description, appended claims, and accompanying drawings where:

FIG. 8 is an illustration of a preferred embodiment of the user interface.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. As used herein, the term "database" refers to a set of related data and the way it is organized. Access to this data is usually provided by a database management system (DBMS) consisting of an integrated set of computer software that allows professionals to interact with one or more databases and provides access to all of the data contained in the database. The DBMS provides various functions that allow entry, storage and retrieval of large quantities of information and provides ways to manage how that information is organized. Because of the close relationship between the database and the DBMS, as used herein, the term "database" refers to both a database and DBMS.

As will be evident from the disclosure provided below, the present invention satisfies the need for a system and method capable of contextually organizing and visualizing work product related to a task in order increase the efficiency of professionals.

Figure 1:
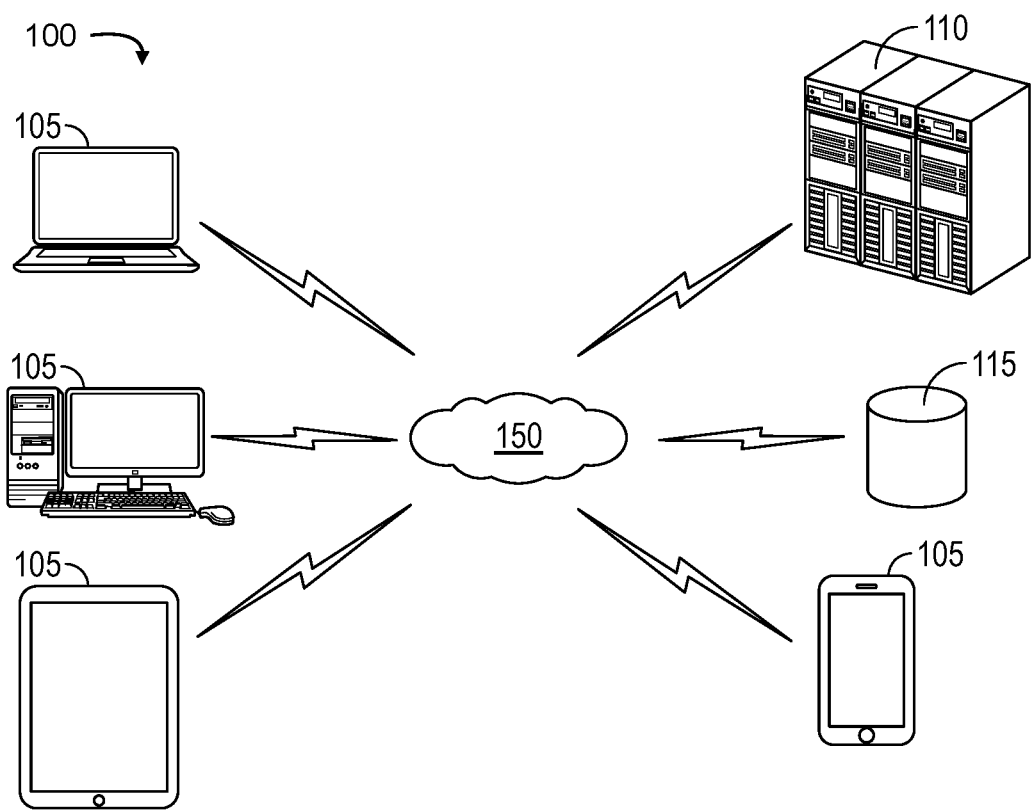
FIG. 1 is a diagram of an example environment in which techniques described herein may be implemented.

FIG. 1 depicts an exemplary environment 100 of the system 500 consisting of clients 105 connected to a server 110 and/or database 115 via a network 150. Clients 105 are devices of professionals 505 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a professional 505. For instance, a client 105 may include a personal computer, a wireless telephone, a personal digital assistant (PDA), a laptop, a smart phone, a tablet computer, or another type of computation or communication device. Servers 110 may include devices that access, fetch, aggregate, process, search, provide, and/or maintain documents. Although FIG. 1 depicts a preferred embodiment of an environment 100 for the system 500, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 500 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 500 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from professionals 505, search one or more databases 115 in response to the search queries and/or inputs, and provide documents or information, relevant to the search queries and/or inputs, to professionals 505. In some implementations, search servers may include a web search server that may provide webpages to professionals 505, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows professionals 505 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
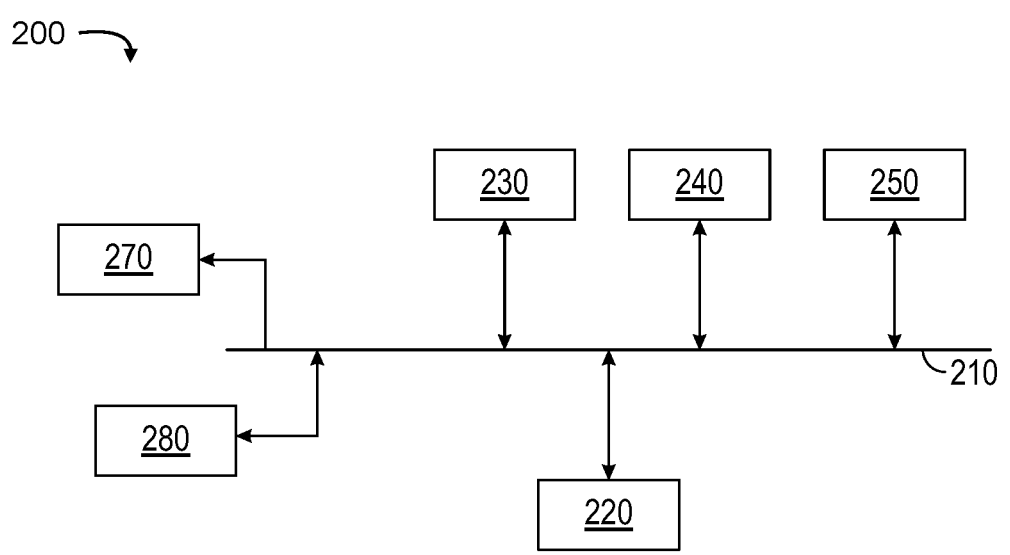
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280. The bus 210 may be defined as one or more conductors that permit communication among the components of the computing entity 200. The processor 220 may be defined as a logic circuitry that responds to and processes the basic instructions that drive the computing entity 200. Memory 304 may be defined as the integrated circuitry that stores information for immediate use in a computing entity 200. A peripheral device 270 may be defined as any hardware used by a professional 505 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 500. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 511, applications run by a computing entity 200, and wireless communication by a communication device of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

Memory 304 stores information within computing device 300. In some preferred embodiments, memory 304 may include one or more volatile memory units. In another preferred embodiment, memory 304 may include one or more non-volatile memory units. Memory 304 may also include another form of computer-readable medium, such as a magnetic or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a professional 505 and the processor 220. The peripheral device 270 may include, but is not limited to, an input device and/or an output device. As used herein, an input device may be defined as a device that allows a professional 505 to input data and instructions that is then converted into a pattern of electrical signals in binary code that are comprehensible to a computing entity 200. An input device of the peripheral device 270 may include one or more conventional devices that permit a professional 505 to input information into the computing entity 200, such as a scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the professional 505. An output device of the peripheral device 270 may include one or more conventional devices that output information to a professional 505, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a fitness tracker may transfer data to a smartphone, wherein the smartphone may use that data in a manner separate from the fitness tracker.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
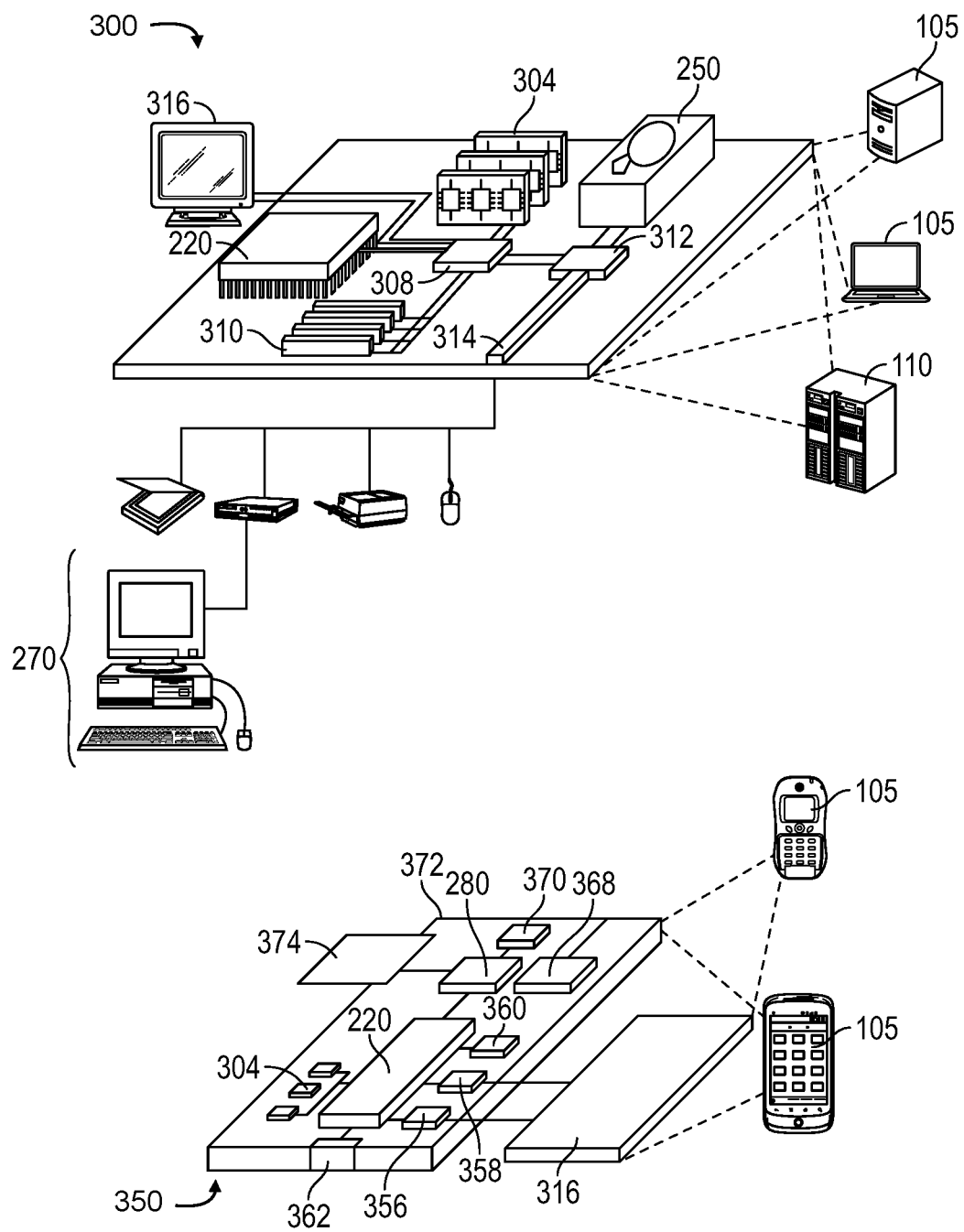
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers, databases, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 511, applications run by the mobile computing device 350, and wireless communication by the mobile computing device 350. The processor 220 of the mobile computing device 350 may communicate with a professional 505 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a professional 505. The control interface 358 may receive commands from a professional 505 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a professional 505 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a professional 505 and covert the received spoken information into a digital form that may be processed by the processor 220. The audio codec 360 may likewise generate audible sound for a professional 505, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 500 may also comprise a power supply. The power supply may be any source of power that provides the system 500 with power. In an embodiment, the power supply may be a stationary power outlet. The system 500 may comprise of multiple power supplies that may provide power to the system 500 in different circumstances. For instance, the system 500 may be directly plugged into a stationary power outlet, which may provide power to the system 500 so long as it remains in one place. However, the system 500 may also be connected to a backup battery so that the system 500 may receive power even when the it is not connected to a stationary power outlet or if the stationary power outlet ceases to provide power to the computing entity 200.

Figure 4:
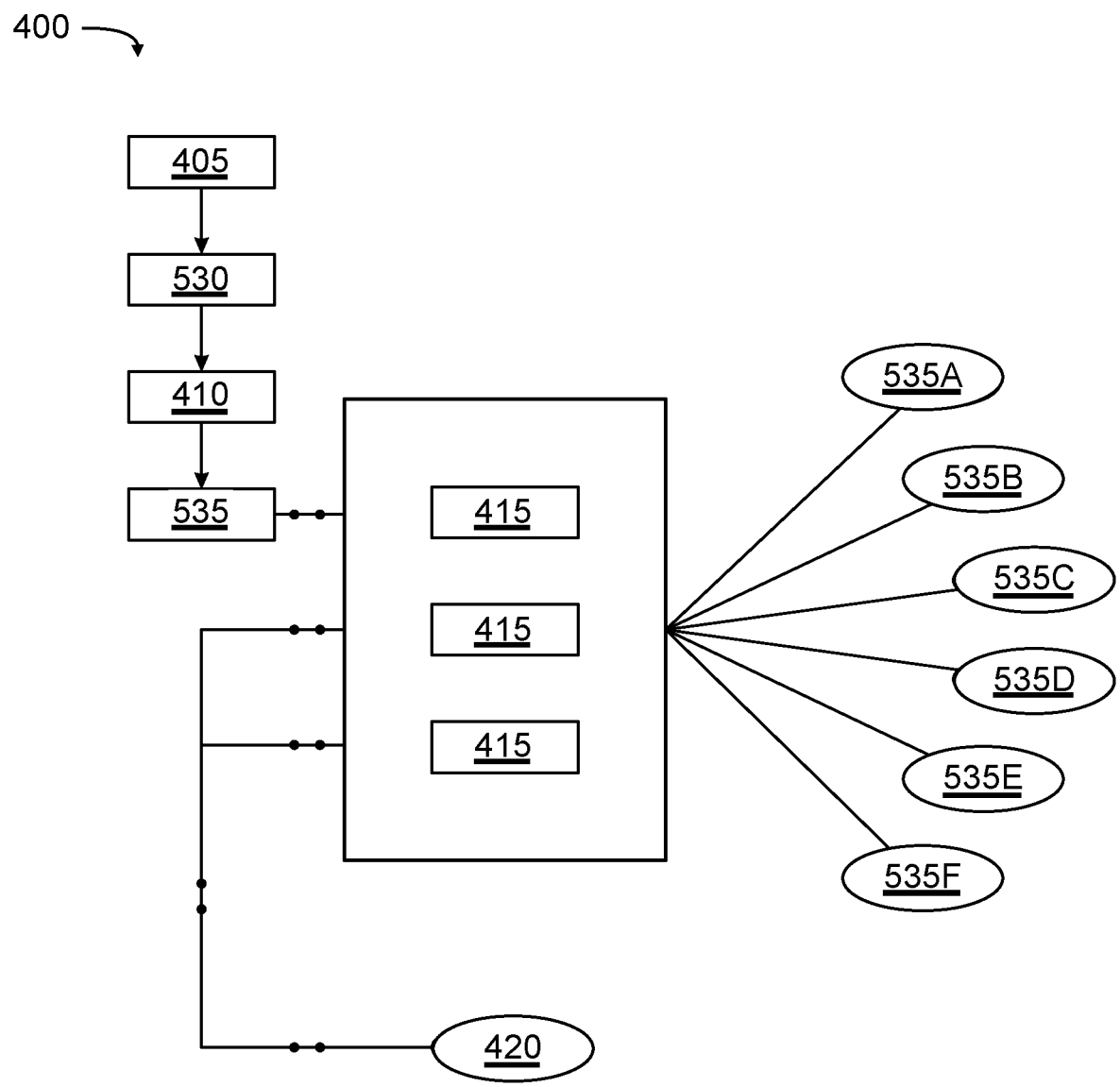
FIG. 4 is a diagram illustrating how to contextually organize work product consistent with the principles of the present disclosure.
Figure 5:
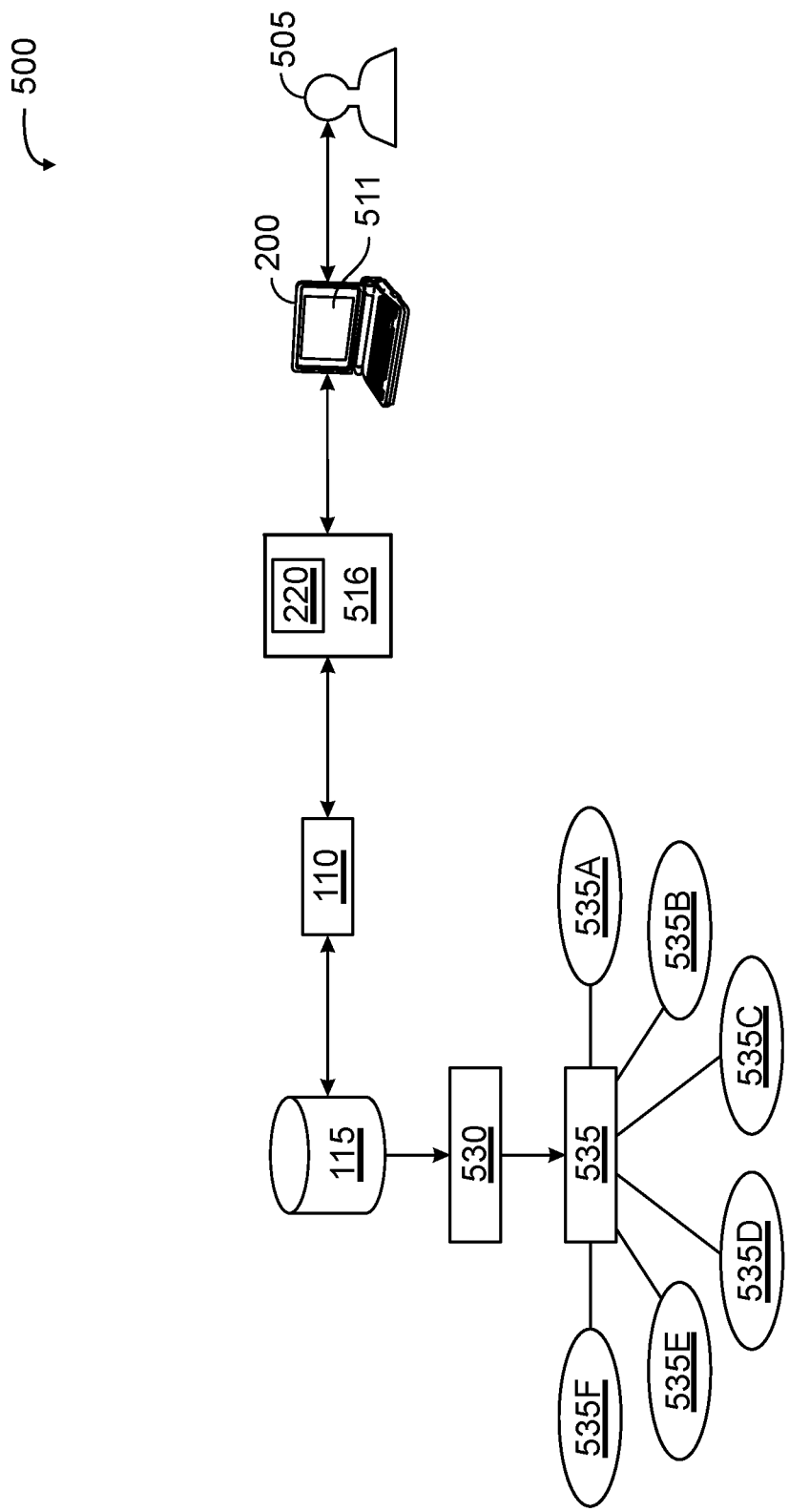
FIG. 5 is a diagram illustrating a system embodying features consistent with the principles of the present disclosure.
Figure 6:
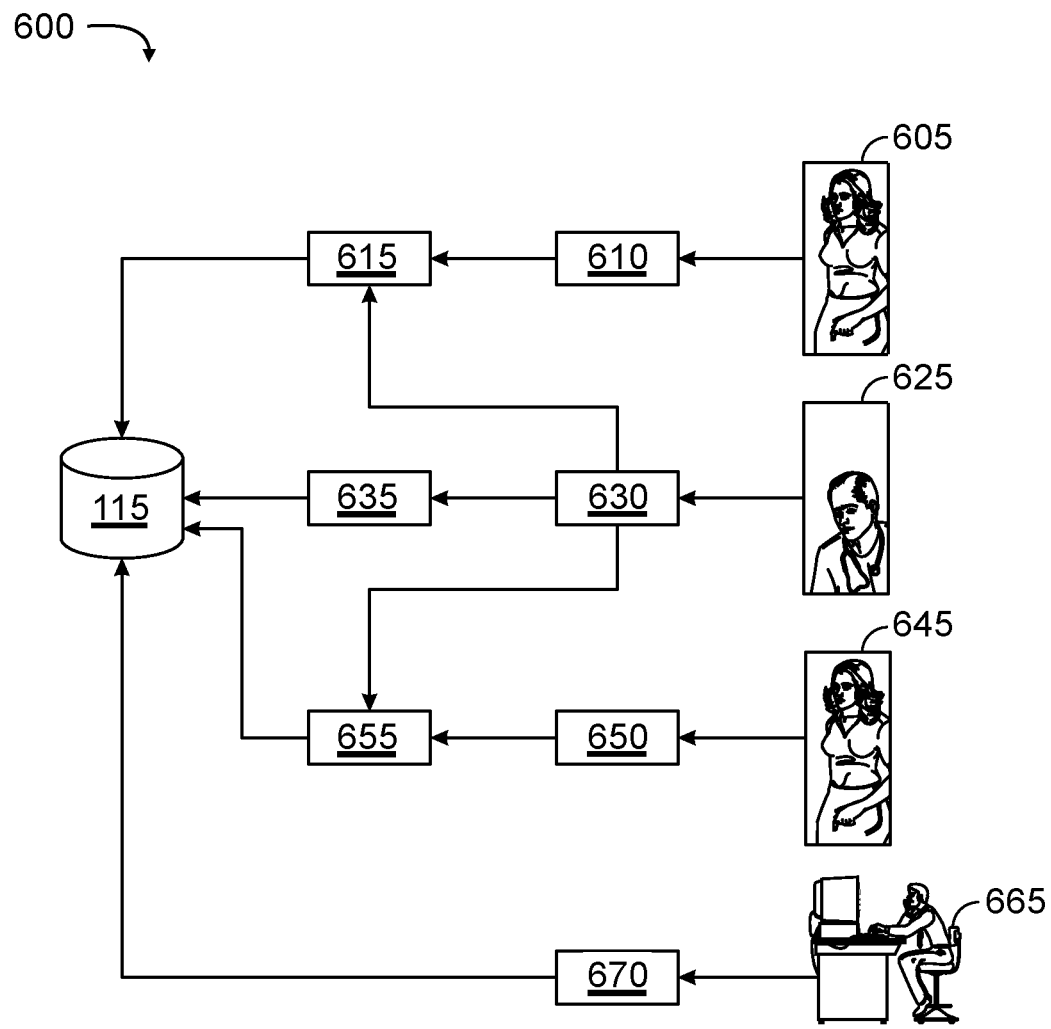
FIG. 6 is a diagram illustrating the manner in which individual access to data may be granted or limited based on user roles or administrator roles.
Figure 7:
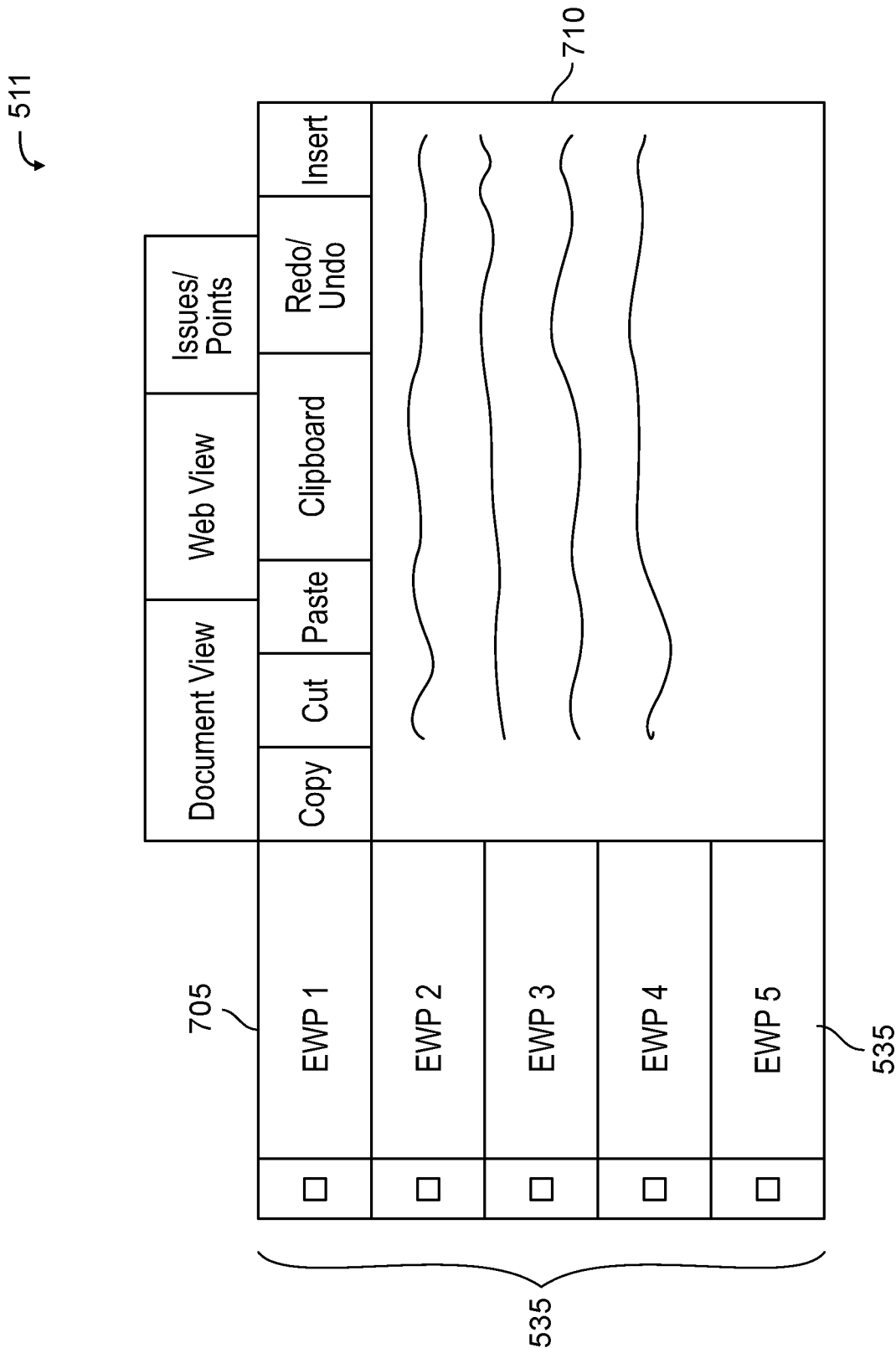
FIG. 7 is an illustration of a preferred embodiment of the user interface.
Figure 9:
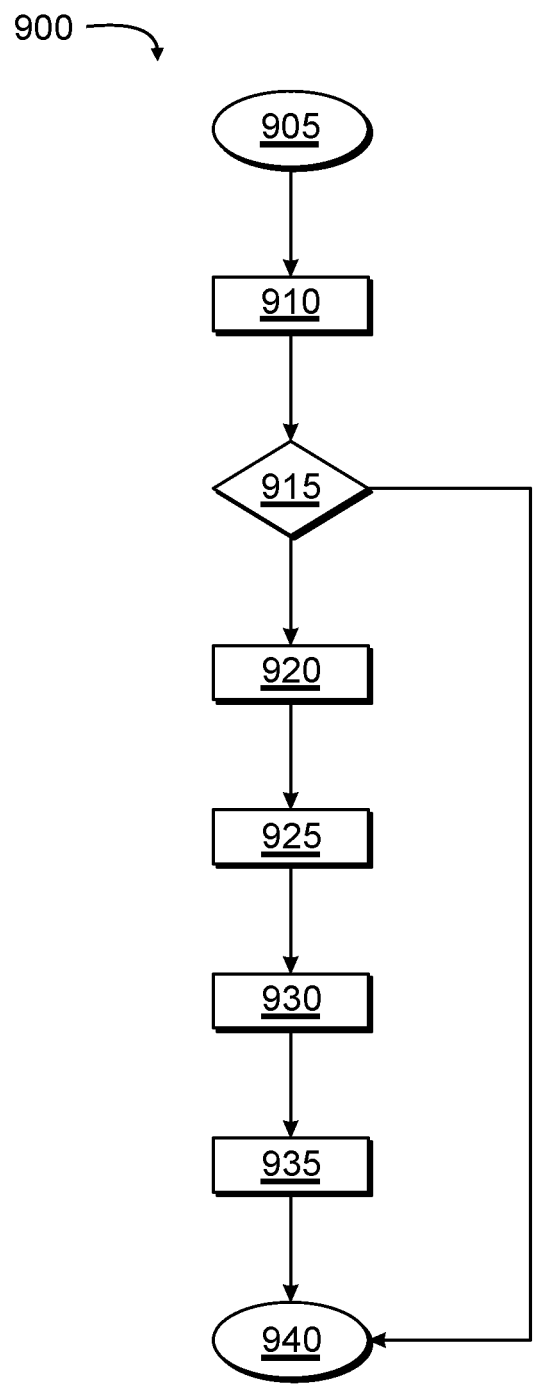
FIG. 9 is a flow chart illustrating certain method steps of a method embodying features consistent with the principles of the present disclosure.
Figure 10:
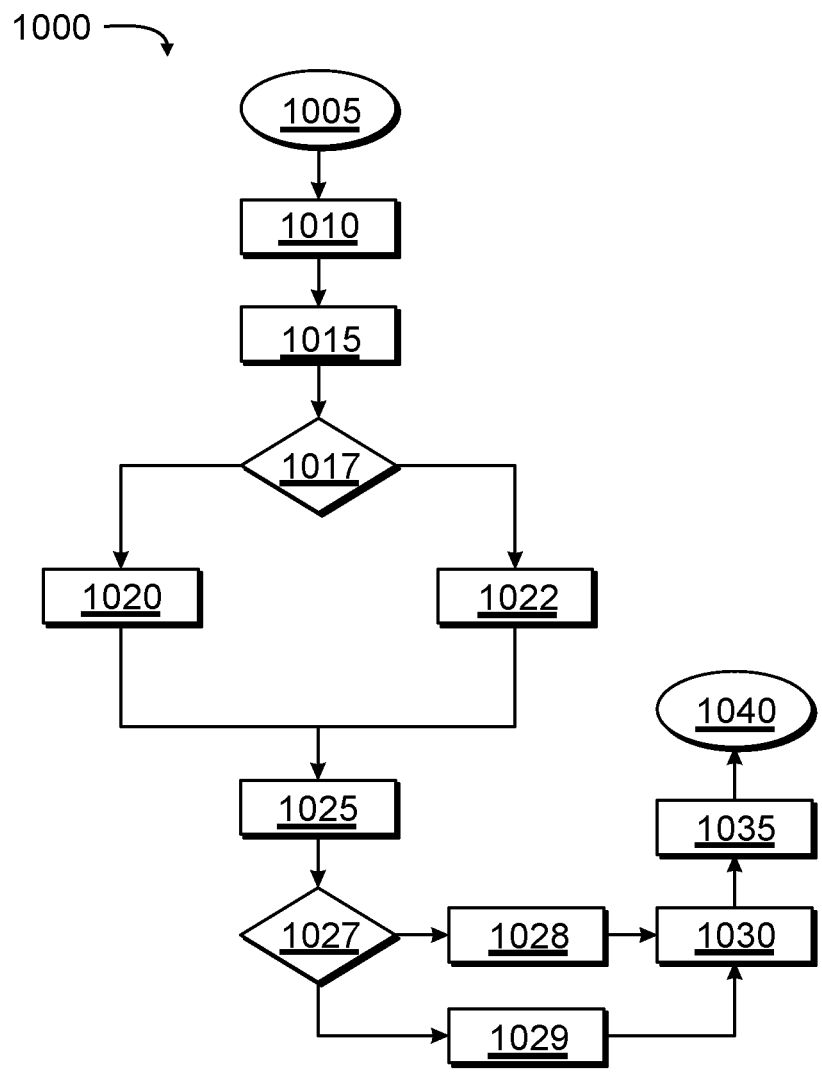
FIG. 10 is a flow chart illustrating certain method steps of a method embodying features consistent with the principles of the present disclosure.
Figure 11:
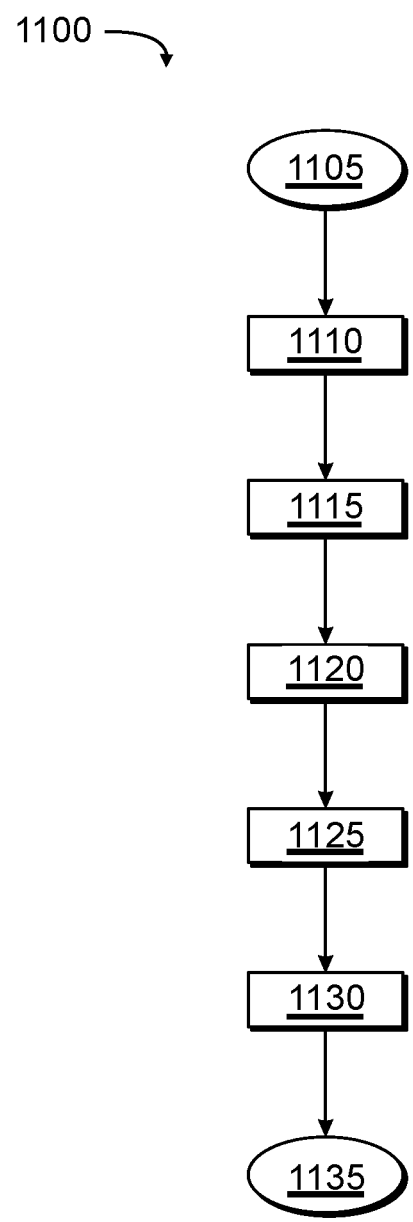
FIG. 11 is a flow chart illustrating certain method steps of a method embodying features consistent with the principles of the present disclosure.

FIGS. 4-11 illustrate embodiments of a system 500 and methods 900, 1000, 1100 for visually transforming electronic work product into a contextual depiction of a professional task 535 is disclosed herein. The methods generally comprise contextually organizing and visualizing a professional's 505 work product within a user interface 511. FIG. 4 depicts how the system 500 contextually organizes data to create a feedback loop in a way such that the data may be used to contextually visualize to a professional task 535. FIG. 5 depicts an embodiment of the disclosed system 500. FIG. 6 illustrates permission levels 600 that may be utilized by the present system 500 for controlling access to electronic work product. FIGS. 7 and 8 illustrate example screenshots of a user interface 511 of the system 500. FIGS. 9-11 illustrate various methods that may be carried out by the system 500. It is understood that the various method steps associated with the methods 900, 1000, 1100 of the present disclosure may be carried out as operations by the system 500 depicted in FIG. 5.

As illustrated in FIG. 4, information is contextually organized 400 within the system 500 in terms of a domain 405, project 530, professional 505, and professional task 535. In a preferred embodiment, the professional task 535 may further be broken into subtasks 415. The domain 405 may be defined as the organization to which the electronic work product belongs. The project 530 may be defined as a collaborative enterprise designed to accomplish a particular goal via electronic work product. A task may be defined as a piece of work to be accomplished by a professional 505 that results in a piece of electronic work product. All electronic work product created using the system 500 is categorized in this manner so that the electronic work product is always contextually related to the professional task 535, user profiles 410, project 530, and domain 405.

As illustrated in FIG. 5, the system 500 generally comprises a processor 220, a power supply, a computing device 200 operably connected to the processor 220, and a non-transitory computer-readable medium 516 coupled to the processor 220 and having instructions stored thereon. In one preferred embodiment, the system 500 may further comprise a database 115 operably connected to the processor 220. In another preferred embodiment, a server 110 may be operably connected to the database 115 and processor 220, facilitating the transfer of information between the processor 220 and database 115. The system 500 preferably contextually organizes electronic work product so that it relates to a particular professional task 535. The system 500 is also designed to contextually visualize the electronic work product in the form of a professional task 535. Because many professional tasks 535 generally have a specific template in which information is arranged, the electronic work product is preferably ordered in a way that is compatible with the template associated with a professional task 535. Once organized, the processor 220 may transform the electronic work product into a visual representation of a professional task 535 within the user interface 511 and present it to a professional 505 via a display. In a preferred embodiment, professional tasks 535 may be any task in which data is to be organized in a comprehensive manner common to a profession. Electronic work product is data that makes up a particular professional task 535. Organizing electronic work product of a professional tasks 535 involves parsing the data that makes up a professional task 535 and categorizing the data in a way such that the system 500 may transform that data into a visual representation of a professional task 535 in a categorical way. For instance, the professional task 535 of a memo may have data that pertains to different types of electronic work product, such as heading/overview, context, tasks/resolutions, details, conclusion, and attachments.

Once the system 500 has categorized and/or organized electronic work product to create a professional task 535, the system 500 may visualize the electronic work product within a user interface 511 in a way such that it may allow a professional 505 to easily review a professional task 535 via the display. The electronic work product within a professional task 535 may be organized and/or categorized into numerous categories, which may be examined within the user interface 511. In a preferred embodiment, electronic work product of a professional task 535 may be categorized as contacts 535A, emails 535B, notes 535C, citations 535D, documents 535E, messages 535F, or any combination thereof, but is not limited to these categories. For instance, a professional 505 may use the user interface 511 to view references and citations 535D within a particular professional task 535 that a professional 505 knows is relevant to a professional task 535 they are currently working on.

In a preferred embodiment, the "contacts" 535A category relates to electronic work product that contains contact information for a particular person or entity within a professional task 535. The "emails" 535B category relates to electronic work product that contains email data that was related to a particular professional task 535. The "notes" 535C category relates to electronic work product that contains information that a professional 505 felt warranted a comment to make pertinent information within a professional task 535 clearer. The "citations" 535D category relates to electronic work product that contains a reference to a published or unpublished source. The "documents" 535E category relates to electronic work product that contains related documents 535E, web pages, etc. The "messages" 535F category relates to messages 535F sent between professional 505 working on the same professional task 535.

In one preferred embodiment, a machine learning technique may be used to organize and/or categorize the electronic work product. For instance, pattern recognition or computer-aided detection may be used to determine which data may be classified as which electronic work product within a particular professional task 535. Pattern recognition methods may use labeled data that the system 500 may match to various grids of the user interface 511. The system 500 may also use more than one machine learning technique to classify electronic work product and create new professional tasks 535. Computer-aided writing methods may use algorithms to create new professional tasks 535 using electronic work product already within the system 500. For instance, the system 500 may create a memo using electronic work product from previously created memos within the system 500. In one preferred embodiment, the system 500 may also perform research and sue this research to assist in creating new work product. For instance, a professional 505 using the system 500 to write a brief about a particular legal matter may ask the system 500 to perform research and write a rough draft using said research and work product within the system 500.

Machine learning techniques may also be used to as assist professional 505 in formulating new methods for assigning professional tasks 535 and ordering electronic work product within a particular professional task 535. For instance, the system 500 may use supervised deep learning combined with results from computer-aided detection and compound term processing to better assist a managing partner in determining which associates are most efficient at certain types of work product to increase the efficiency of a team. As the system 500 collects and analyzes more data, it will become even better at assisting professional 505 at accomplishing professional tasks 535 in a more efficient and cost-effective manner. For instance, the system 500 may determine that organizing electronic work product within a professional task 535 may result in a higher quality finished product than if the electronic work product was organized in another way. Perhaps the system 500 may determine a CREAC paragraph structure may be more effective than an IRAQ paragraph structure for a particular matter based on results from previous cases.

In another preferred embodiment, the system 500 may comprise a voice recognition interface in conjunction with the machine learning technique. For instance, a professional 505 may ask the system 500 to create a professional task 535 for a particular matter they are working on. The system 500 would then search for related professional tasks 535 and electronic work product from which to base the new electronic work product from. For instance, a professional 505 could ask the system 500 to email a particular contact within the system 500 regarding a particular professional task 535. The system 500 may then prompt the professional 505 to disclose what they would like the email to say. Once the email is sent, the system 500 may save the email in a way such that it is contextually related to the professional task 535. Whenever a professional 505 selects that professional task 535 within the user interface 511, that email along with other related work product would be presented to the professional 505 within the user interface 511. In yet another preferred embodiment of the system 500, a timing function may allow professionals 505 to record how long they work on a particular professional task 535, which is then saved by the system 500. The system 500 may then track how much time has been spent on a particular project 530.

Alternatively, the system 500 may assist a professional 505 in a way that does not involve the use of machine learning techniques. In one preferred embodiment, the system 500 may use indicia to highlight electronic work product that may be relevant to a particular professional task 535. For instance, a plaintiff claiming to have fallen on a wet floor of a retail box store may have a history of making such claims. The system 500 may parse professional tasks 535 for electronic work product related to the current plaintiff's past complaints and present them to the professional 505. For instance, an insurance company may have a pattern of settling certain types of cases. The system 500 may be programmed to find professional tasks 535 related to past incidents involving this particular insurance company so that a professional 505 may obtain information that may allow them to receive the most out of a settlement with minimal effort. For instance, the system 500 may allow a professional 505 to move electronic work product from one professional task 535 to another professional task 535 so that new professional tasks 535 may be generated by a professional 505 as efficiently as possible.

In a preferred embodiment, the programming instructions responsible for the operations carried out by the processor 220 are stored on a non-transitory computer-readable medium 516 ("CRM"), which may be coupled to the server 110, as illustrated in FIG. 5. Alternatively, the programming instructions may be stored or included within the processor 220. Examples of non-transitory computer-readable mediums 516 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 516.

In an embodiment, the system 500 may further comprise a computing device 200 operably connected to the processor 220. A computing device 200 may be implemented in a number of different forms, including, but not limited to, servers 110, multipurpose computers, mobile computers, etc. For instance, a computing device 200 may be implemented in a multipurpose computer that acts as a personal computer for a professional 505, such as a laptop computer. For instance, components from a computing device 200 may be combined in a way such that a mobile computing device 200 is created, such as mobile phone. Additionally, a computing device 200 may be made up of a single computer or multiple computers working together over a network 150. For instance, a computing device 200 may be implemented as a single server 110 or as a group of servers 110 working together over and Local Area Network (LAN), such as a rack server 110 system 500. Computing devices 200 may communicate via a wired or wireless connection. For instance, wireless communication may occur using a Bluetooth, Wi-Fi, or other such wireless communication device.

In an embodiment, the system 500 may further comprise a user interface 511. A user interface 511 may be defined as a space where interactions between a professional 505 and the system 500 may take place. In a preferred embodiment, the interactions may take place in a way such that a professional 505 may control the operations of the system 500, and more specifically, allow a professional 505 to control how the system 500 transforms electronic work product into a visual representation of a task. A professional 505 may input instructions to control operations of the system 500 manually using an input device. For instance, a professional 505 may choose data filters where directed by the user interface 511 using an input device, including, but not limited to, a keyboard, mouse, or touchscreen. A user interface 511 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 500 may present data of the user interface 511 to the professional 505 via a display operably connected to the processor 220.

A display may be defined as an output device that communicates data that may include, but is not limited to, visual, auditory, cutaneous, kinesthetic, olfactory, and gustatory, or any combination thereof. Information presented via a display may be referred to as a soft copy of the information because the information exists electronically and is presented for a temporary period of time. Information stored on the non-transitory computer-readable medium 516 may be referred to as the hard copy of the information. For instance, a display may present a soft copy of a visual representation of electronic work product via a liquid crystal display (LCD), wherein the hardcopy of the visual representation of electronic work product may be stored on a local hard drive. For instance, a display may present a soft copy of audio information via a speaker, wherein the hard copy of the audio information is stored on a flash drive. For instance, a display may present a soft copy of a professional task 535 containing electronic work product, wherein the hard copy of the professional task 535 containing the electronic work product is stored within a database 115. Displays may include, but are not limited to, cathode ray tube monitors, LCD monitors, light emitting diode (LED) monitors, gas plasma monitors, screen readers, speech synthesizers, haptic suits, speakers, and scent generating devices, or any combination thereof, but is not limited to these devices.

As illustrated in FIG. 5, the system 500 may comprise a database 115 operably connected to the processor 220. The database 115 may be operably connected to the processor 220 via wired or wireless connection. In a preferred embodiment, the database 115 is configured to store electronic work product therein. Electronic work product may include, but is not limited to, contacts 535A, emails 535B, notes 535C, citations 535D, references, documents 535E, messages 535F, or any combination thereof. The database 115 may be a relational database such that the electronic work product associated with each user profile 410 within the plurality of user profiles 410 may be stored, at least in part, in one or more tables. Alternatively, the database 115 may be an object database such that electronic work product associated with each user profile 410 within the plurality of user profiles 410 are stored, at least in part, as objects. In some instances, the database 115 may comprise a relational and/or object database 115 and a server 110 dedicated solely to managing the electronic work product in the manners disclosed herein.

As mentioned previously, the system 500 may comprise a power supply. The power supply may be any source of power that provides the system 500 with electricity. In one preferred embodiment, the system 500 may comprise of multiple power supplies that may provide power to the system 500 in different circumstances. For instance, the system 500 may be directly plugged into a stationary power outlet, which may provide power to the system 500 so long as it remains in one place. However, the system 500 may also be connected to a battery so that the system 500 may receive power even when the it is not connected to a stationary power outlet. In this way, the system 500 may always receive power so that it may continuously update electronic work product and provide professionals 505 with a visual representation of said electronic work product as professional tasks 535.

In a preferred embodiment, professionals 505 may access professional tasks 535 and/or electronic work product via the user interface 511, which may be accomplished by causing the processor 220 to query the non-transitory computer-readable medium 516, server 110, and/or database 115. The non-transitory computer-readable medium 516, server 110, and/or database 115 may then transmit electronic work product back to the processor 220, wherein the processor 220 may then deconstruct, reorganize, and transform the data before presenting it to a professional 505 via a display. In a preferred embodiment, the user interface 511 may comprise a plurality of grids, wherein each grid within the plurality of grids presents professional tasks 535 as electronic work product to the professional 505. This information may be presented to the professional 505 in a way such that the professional 505 may quickly make use of the information to create new professional tasks 535 from the electronic work product. For instance, the system 500 may present categorized electronic work product in a way such that a particular professional task 535 may be viewed by a professional 505 in its most basic parts. In a preferred embodiment, this may be done using a plurality of interconnected grids, wherein the data of one grid is linked to the data in another grid in a way that visually emphasizes certain aspects of a professional task 535. For instance, a professional 505 may operate the system 500 in a way such that a professional task 535 may be presented to the professional 505 via an ordered series of electronic work product. By operating the user interface 511 in a way that allows the professional 505 to interact with the electronic work product within a grid, the system 500 may allow the professional 505 to use that electronic work product in a new professional task 535 and/or to edit the information of that particular electronic work product.

In one preferred embodiment, as illustrated in FIG. 7, the user interface 511 may comprise two grids: Task Grid 705 and EWP Grid 710. The Task Grid 705 may comprise a vertically oriented, task organized list of electronic work product relevant to a particular task. The EWP Grid 710 may change depending on what electronic work product the professional 505 has selected within the Task Grid 705. Further, the Task Grid 705 may be altered depending on what the professional 505 decides to do with the electronic work product selected in the Task Grid 705. For instance, a teacher using the system 500 could select within the Task Grid 705 a completed electronic work product of a particular student within a plurality of electronic work product of a professional task 535 assigned to a class. The teacher could then read, edit, and/or grade that particular student's work product in the EWP Grid 710. For instance, a medical professional 505 may review a patient's medical history using the system 500 via the Task Grid 705, wherein the electronic work product within the Task Grid 705 comprises various tests and procedures that the patient has experienced over time. Therefore, the professional task 535 presented to the medical professional within the Task Grid 705 is actually a compilation of the patient's medical history. The medical professional 505 may select various medical events in a patient's life to see more details in the EWP Grid 710 and create new electronic work product using the information available in the system 500 in order to decrease the amount of time performing electronic paperwork.

In another preferred embodiment, as illustrated in FIG. 8, the user interface 511 may comprise a Category Grid that allows a professional 505 to choose what type of electronic work product they would like to create. For instance, a professional 505 may select a professional task 535 within the user interface 511, which will subsequently allow the professional 505 to create subtasks 415 for that particular professional task 535. When the professional 505 chooses to create a new subtask 415, the system 500 may present the Category Grid that allows the professional 505 to create a particular piece of electronic work product for the professional task 535. The professional 505 may then edit the subtask 415 within the EWP Grid 710 before saving it. The saved electronic work product is then contextually related to the professional task 535 by the system 500. The professional 505 may also choose to copy existing electronic work product from one task to another task. In a preferred embodiment, a copied piece of electronic work product does not lose its contextual relationship to the professional task 535 from which is was taken. This creates a feedback loop that allows a professional 505 to track where electronic work product originated from. For instance, a professional 505 may copy electronic work product from professional task #203 to professional task #527. At a later date, the professional 505 may need to determine from where that particular piece of electronic work product in professional task #527 originated. Because the system 500 has contextually related that piece of electronic work product of professional task #527 to the electronic work product of professional task #203, the professional 505 may always know the origin of a piece of electronic work product once it is in the system 500.

In another preferred embodiment, the system 500 may comprise a Filter Grid. A professional 505 may use the Filter Grid to search for electronic work product. For instance, a professional 505 may search for a type of professional task 535 using the filter grid, such as a client letter. For instance, a professional 505 may search for electronic work product related to a particular matter using a project 530 filter of the Filter Grid. In one preferred embodiment, a professional 505 may use multiple filters of the Filter Grid to find more specific types of electronic work product. For instance, a professional 505 may use the filter grid to find electronic work product related to a particular professional task 535 that was created by a particular professional 505. In a preferred embodiment, any electronic work product returned to the professional 505 and presented via the Filter Grid contains information regarding the domain 405, project 530, professional 505, and professional task 535 to which it is contextually related. In one preferred embodiment, the system 500 may also recommend other electronic work product within the system 500 that is related any electronic work product selected within the Filter Grid. For instance, if the selected electronic work product was copied from another piece of electronic work product, the system 500 may recommend that other piece of electronic work product to the professional 505.

To prevent un-authorized professionals 505 from accessing all of electronic work product and professional tasks of the system 500, the system 500 may employ a security method. As illustrated in FIG. 6, the security method of the system 500 may comprise a plurality of permission levels 600 that may allow a professional 505 to view content 615, 635, 655 within the database 115 while simultaneously denying professionals 505 without appropriate permission levels 600 the ability to view said content 615, 635, 655. To access the electronic work product and professional tasks stored within the database 115, professionals 505 may be required to make a request via a user interface 511. Access to the data within the database 115 may be granted or denied by the processor 220 based on verification of a requesting user's 605, 625, 645 permission level 600. If the requesting user's 605, 625, 645 permission level 600 is sufficient, the processor 220 may provide the requesting user 605, 625, 645 access to content 615, 635, 655 stored within the system 500. Conversely, if the requesting user's 605, 625, 645 permission level 600 is insufficient, the processor 220 may deny the requesting user 605, 625, 645 access to content 615, 635, 655 stored within the system 500. In an embodiment, permission levels 600 may be based on user roles 610, 630, 650 and administrator roles 670, as illustrated in FIG. 6. User roles 610, 630, 650 allow requesting professionals 505 to access content 615, 635, 655 that a professional 505 has uploaded and/or otherwise obtained through use of the system 500. Administrator roles 670 allow administrators 665 to access system 500 wide data, including managerial permissions, as well as assign new tasks to other professionals 505.

In an embodiment, user roles 610, 630, 650 may be assigned to a professional 505 in a way such that a requesting user 605, 625, 645 may access tasks and user profiles 410 containing electronic work product via a user interface 511. In an embodiment, the system 500 may be configured to send a professional 505 a notification indicating that another professional 505 has shared information with them. To access the data within the database 115, a professional 505 may make a user request via the user interface 511 to the processor 220. In an embodiment, the processor 220 may grant or deny the request based on the permission level 600 associated with the requesting user 605, 625, 645. Only professionals 505 having appropriate user roles 610, 630, 650 or administrator roles 670 may access the content 615, 635, 655. For instance, as illustrated in FIG. 6, requesting user 1 605 has permission to view user 1 content 615 whereas requesting user 2 625 has permission to view user 1 content 615, user 2 content 635, and user 3 content 655. Alternatively, content 615, 635, 655 may be restricted in a way such that a professional 505 may only view a limited amount of content 615, 635, 655. For instance, requesting user 3 645 may be granted a permission level 600 that only allows them to view user 3 content 655 related to a particular client. Therefore, the permission levels 600 of the system 500 may be assigned to professional 505 in various ways without departing from the inventive subject matter described herein.

FIG. 9 provides a flow chart 900 illustrating certain, preferred method steps that may be used to carry out the method for deconstructing a professional task 535 into electronic work product so that it may be transformed into a visualized task. Step 905 indicates the beginning of the method. During step 910, the processor 220 may query the non-transitory computer-readable medium 516 and/or database 115 for professional tasks 535. In a preferred embodiment, based on the results of the query, the processor 220 may determine the appropriate course of action to take in step 915. If processor 220 determines that no professional task 535 relevant to the search parameters exists within the non-transitory computer-readable medium 516 and/or database 115, the system 500 may proceed to the terminate method step 940. If the processor 220 determines that a professional task 535 relevant to the search parameters does exist within the non-transitory computer-readable medium 516 and/or database 115, the processor 220 may retrieve that data from the non-transitory computer-readable medium 516 and/or database 115 in step 920.

Once the professional tasks 535 have been retrieved, the processor 220 may deconstruct the professional tasks 535 into electronic work product during step 925. In a preferred embodiment, the electronic work product may be sorted into categories, including, but not limited to, points 420, contacts 535A, emails 535B, notes 535C, citations 535D, references, documents 535E, messages 535F, or any combination thereof. The processor 220 may then construct the professional task 535 within the user interface 511 during step 930. In a preferred embodiment, the professional task 535 is reconstructed within a plurality of grids of the user interface 511. In another preferred embodiment, the grids comprise a Task Grid 705 and an EWP Grid 710. The electronic work product is preferably reconstructed within the Task Grid 705 in an order relevant to the professional task 535 in which the electronic work product is obtained. A professional 505 may edit electronic work product in the EWP Grid 710 once selected in the Task Grid 705. Once the professional task 535 has been restructured within the user interface 511, the processor 220 may display the professional task 535 and its associated electronic work product via a display in step 935. The method may then proceed to the terminate method step 940.

FIG. 10 provides a flow chart 1000 illustrating certain, preferred method steps that may be used to carry out the method for deconstructing a professional task 535 into electronic work product so that it may be transformed into a visualized task. Step 1005 indicates the beginning of the method. During step 1010, the processor 220 may receive professional tasks 535 from the database 115. During step 1015, the processor 220 may perform a check to determine if a data filter has been selected within the user interface 511. In a preferred embodiment, a data filter allows the processor 220 to restrict the search for electronic work product within a professional task 535 to certain categories. These data filters may include, but are not limited to, task type, electronic work product type, matter type, professional 505 assignment, key words, or any combination thereof. If the processor 220 determines no data filter has been selected, the processor 220 may organize the electronic work product in way that represents a professional task 535 in step 1020. If the processor 220 determines that a data filter has been selected within the user interface 511, the processor 220 may proceed to filter the electronic work product in step 1017. The processor 220 may filter the electronic work product by limiting the search for electronic work product to only those categories selected by the professional 505. For instance, a professional 505 who chooses the task type and matter type filters may only be shown electronic work product of those categories and subcategories. For instance, a professional 505 who chooses a data filter pertaining to the subcategory of legal precedent in a particular professional task 535 may only be shown electronic work product containing legal precedent. For instance, a teacher who chooses a data filter instructing the processor 220 to not search for students' electronic work product related to homework may be shown all of her students' electronic work product except that which pertains to homework.

During step 1020, the processor 220 may analyze the electronic work product to determine how the data should be presented within the user interface 511. Based on the results of the analysis, the processor 220 may determine the appropriate course of action to take in step 1025. In a preferred embodiment, the processor 220 determines whether the electronic work product should be presented as a professional task 535 or as a related group. If processor 220 determines the electronic work product should be presented as a professional task 535, the method may proceed to step 1026. If processor 220 determines the electronic work product should be presented as a group, the method may proceed to step 1028. During step 1026, the processor 220 may organize the electronic work product in the form of an assigned task. For instance, if a professional 505 selects a particular task 535 within the user interface 511, the system 500 may present that professional task 535 in the form of the various electronic work product that make up the professional task 535. During step 1026, the processor 220 may organize the electronic work product in the form of a group. For instance, if a professional 505 chooses search parameters that narrow the returned electronic work product to particular categories, the system 500 may present that electronic work product in an order of relevancy, creation date, matter name, etc. Once grouped and/or ordered, the processor 220 may proceed to step 1030, wherein the processor 220 may transform the grouped and ordered electronic work product into a visualized professional task 535 or work product grouping. The visualized professional task 535 or work product grouping may then be presented to the professional 505 via a display operably connected to the processor 220 in step 1035. Once the information has been presented via the display, the method may proceed to the terminate method step 1040.

FIG. 11 provides a flow chart 1100 illustrating certain, preferred method steps that may be used to carry out the method of adding electronic work product to a professional task 535. Step 1105 indicates the beginning of the method. During step 1110, the professional 505 may select electronic work product within the Task Grid 705. Once selected, the processor 220 may populate the EWP Grid 710 with the selected work product during step 1115. During step 1120, the professional 505 may choose to clone the electronic work product in. the EWP Grid 710. The system 500 may then clone the selected electronic work product during step 1125. Once cloned, the processor 220 may save the new electronic work product containing the information within the selected electronic work product during step 1130. In a preferred embodiment, the professional 505 may save the work clone electronic product to a particular professional task 535. For instance, a professional 505 may clone contact information from one professional task 535 and add it to another professional task 535. Once the electronic work product has been cloned, the system 500 may proceed to the terminate method step 1135.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one input/output device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a professional, the subject matter described herein may be implemented on a computer having a display device, such as a cathode ray tube (CRD), liquid crystal display (LCD), light emitting display (LED) monitor for displaying information to the professional and a keyboard and a pointing device, such as a mouse or a trackball, by which the professional may provide input to the computer. Displays may include, but are not limited to, visual, auditory, cutaneous, kinesthetic, olfactory, and gustatory displays, or any combination thereof.

Other kinds of devices may be used to facilitate interaction with a professional as well. For example, feedback provided to the professional may be any form of sensory feedback, such as visual feedback, auditory feedback, or tactile feedback; and input from the professional may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a professional may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A method for automating electronic work product comprising:
   continuously updating, by a computing device, an electronic work product to provide a professional with a visual representation of said electronic work product via a display,
      wherein said computing device hosts a user interface used to access said electronic work product and to visualize a professional task,
      wherein said professional task is an ordered series of electronic work product categories of said electronic work product that is visualized to form a visualized task,
   receiving, by said user interface of said computing device, input from a professional that is related to said professional task;
   associating, by pattern recognition executed by a machine learning technique, said input to an initial professional task based on information in a task grid and an electronic work product grid of said initial professional task, wherein said electronic work product grid contains said electronic work product;

cloning, by said computing device, said information in said task grid and said electronic work product of said electronic work product grid of said initial professional task to create a cloned work product;

saving, by said computing device, said cloned work product as a new professional task;

contextually relating, by said computing device, on said electronic work product grid, said electronic work product to said new professional task by creating a feedback loop which tracks where said electronic work product originated from, without losing contextual relationship to said initial professional task from which it was taken;

reorganizing and transforming, by said computing device, data within a plurality of interconnected grids, by linking together said task grid and said electronic work product grid to allow said new professional task to be viewed as said visualized task and to further allow said professional to edit said electronic work product and use said electronic work product to create other professional tasks;

deconstructing, by said computing device, said professional task into said electronic work product by filtering said electronic work product into the electronic work product categories;

determining, using said machine learning technique, a more effective paragraph structure for organization said electronic work product of said new professional task when compared to initial paragraph structures used in said initial professional task;

reconstructing, by said computing device, said information within said task grid and said electronic work product within said electronic work product grid of said new professional task based on said more effective paragraph structure;

presenting, by said computing device, after reconstruction, said new professional task and associated electronic work product via said display as said visualized task;

selecting, said visualized task within said task grid;

populating, by said computing device, after selection of said visualized task, said electronic work product grid with said associated electronic work product;

altering, by said computing device, said task grid based on how said professional manipulates said electronic work product selected in said task grid; and tracking, by said computing device, how much time said professional has spent on said professional task.

2. The method of claim 1, further comprising:

allowing said professional to view respective content according to respective permission levels while simultaneously denying access to said respective content to other professionals without said respective permission levels.

3. The method of claim 2, further comprising:

sending to said professional, by said computing device, a notification that one of said other professionals has shared information with said professional.

4. The method of claim 1, wherein said more effective paragraph structure is based on a template, wherein said template helps determine which electronic work product is relevant to said new professional task.

5. The method of claim 4, wherein said template and said electronic work product are used to transform said visualized task.

6. The method of claim 1, wherein said task grid comprises a vertically oriented list of a plurality of professional tasks, wherein selection of said professional task within said task grid causes said task grid to visualize the electronic work product categories.

* * * * *